United States Patent [19]

Giger

[11] Patent Number: 4,620,788

[45] Date of Patent: Nov. 4, 1986

[54] APPARATUS FOR MEASURING PULSE SIGNAL DELAY INTERVAL

[75] Inventor: Kurt Giger, Heerbrugg, Switzerland

[73] Assignee: Wild Heerbrugg, AG, Heerbrugg, Switzerland

[21] Appl. No.: 510,223

[22] Filed: Jul. 1, 1983

[30] Foreign Application Priority Data

Jul. 13, 1982 [CH] Switzerland .................. 4269/82

[51] Int. Cl.⁴ .................. G01C 3/08; G01S 13/10; H03K 5/00
[52] U.S. Cl. .................. 356/5; 368/118; 328/129.1; 328/155; 342/135
[58] Field of Search .......... 356/5, 28.5; 343/13 R; 368/118; 328/63, 155, 179, 129.1; 307/262, 269, 511; 331/25

[56] References Cited

U.S. PATENT DOCUMENTS

| | | | |
|---|---|---|---|
| 3,296,525 | 1/1967 | Sakuma | 368/118 |
| 3,505,594 | 4/1970 | Tarczy-Hornoch | 328/129.1 |
| 3,541,448 | 11/1970 | Nutt | 368/118 |
| 3,618,089 | 11/1971 | Moran, Jr. | 343/13 R |
| 3,900,261 | 8/1975 | Wingate | 356/5 |
| 3,982,192 | 9/1976 | Newton et al. | 328/129.1 |
| 3,983,481 | 9/1976 | Nutt et al. | 368/118 |
| 4,077,718 | 3/1978 | Graham, Jr. et al. | 356/5 |
| 4,159,873 | 7/1979 | Farnsworth | 356/5 |
| 4,490,688 | 12/1984 | Borras et al. | 328/155 |

FOREIGN PATENT DOCUMENTS 2136969 2/1973 Fed. Rep. of Germany.
2437648 4/1980 France.

OTHER PUBLICATIONS

Nachrichtentechnische Zeitschrift, Heft 9, 1973, Berlin (DE) 1973, J. Riegel: "Messung Kurzer Entfernungen mit Hilfe optischer Impulseradar-geräte", pp. 435–440.

Primary Examiner—Stephen C. Buczinski
Assistant Examiner—Linda J. Wallace
Attorney, Agent, or Firm—Roylance, Abrams, Berdo & Goodman

[57] ABSTRACT

Apparatus for measuring the time delay between pulse signals, particularly in conjunction with electro-optical range finders. A coarse measurement counter counts the output of a reference oscillator, while a fine measurement interpolator determines the residual time at the start and finish of a measuring interval. Both residual times are successively determined by the same fine measurement interpolator. A delay circuit only supplies the pulse transmitter with the trigger signal when the interpolation for the start signal in the interpolator is ended. An adjustable series of test pulses is produces by a clock generator, in order to form the average value from such a series of measurements in a logic circuit. Preferably, the clock generator is synchronized with the reference oscillator, which ensures the formation of a mean value with a narrow range of errors.

23 Claims, 5 Drawing Figures

APPARATUS FOR MEASURING PULSE SIGNAL DELAY INTERVAL

This invention relates to an apparatus for measuring the elapsed time or delay interval between electrical pulse signals using an evaluation circuit including a coarse measurement counter and means for fine measurement interpolation.

BACKGROUND OF THE INVENTION

Optical pulse radar equipment measures distances or ranges by applying the time delay principle. The time interval between a transmitted signal and a received signal, i.e., an echo or blip, is used as a measure of the distance from the transmitter-received to an object from which the signal was reflected. Between two electrical signals which are representative of the transmitted and received optical signals, pulses supplied by a fixed frequency crystal oscillator are counted in an evaluation circuit. The time of the transmitted signal is used as a start signal and the time of the received or echo signal is used as the stop signal for the evaluation circuit. Details of such a system can be found in the article "Measurement of Short Ranges with the Aid of Optical Pulsed Radar Equipment", *Nachrichtentechnische Zeitscrift*, No. 9, 535–540, 1973. The difficulty with this counting procedure is that there is no correlation between the transmitted signal which establishes the start line and which starts the pulse count and the edges of the pulses of the crystal oscillator, nor is there synchronization between the echo signal which ends the pulse count and the edges of the oscillator pulses. Thus, at the beginning and end of the pulse count there are residual times which are not taken into consideration and cannot be evaluated for range finding purposes. Each of these undetermined residual times is smaller than a full cycle of the oscillator pulse. Thus, ignoring these residual times is permissible for mesurements which are relatively coarse, i.e., in the kilometer and meter range, but for precise range finding, in which accuracies are to be kept in the centimeter and millimeter range, the previously mentioned measuring method is inadequate.

German OS No. 2,842,450 and U.S. Pat. No. 3,541,448 disclose methods and devices which make a coarse determination of the delay time by means of a coarse measurement and take account of the random residual times by means of additional precision instruments with the aid of precision measurement interpolators in order to derive the precise measured time from the rough measurement using a correction technique. However, the disadvantage of this equipment is the high apparatus expenditure. For mobile use, such as for use in portable range finders using this general principle, this prior art equipment is too heavy and large and is unsuitable under practical conditions. Furthermore, miniaturization cannot be achieved using currently available techniques.

BRIEF SUMMARY OF THE INVENTION

Accordingly, an object of the present invention is to provide an evaluation apparatus for use in a pulse echo range finder which is simpler than presently available equipment and which permits the construction of a small, light and therefore handy piece of equipment, usable in portable apparatus without difficulty, but nevertheless permitting the desired high measurement accuracy.

A further object is to provide such an apparatus which is simple in operation and which involves a simple adjustment process, providing a reliable display of the measured values.

Briefly described, the invention comprises an improved apparatus for measuring the delay interval between pulse signals, the apparatus being of the type including means for producing a start signal, an evaluation circuit with a reference oscillator, a coarse counter for counting reference pulses between a start signal and a stop signal, and fine measurement interpolation means for determining the residual time between the stop signal and the next timing pulse edge of the reference oscillator, the improvement wherein said fine measurement interpolation means comprises only one precision mesurement interpolator for the interpolation of both of the residual intervals between the start signal and the next following reference oscillator timing pulse edge and between the stop signal and the next following reference oscillator timing pulse edge, said residual intervals being separated in time.

With the solution in accordance with the invention, a simple evaluation of analog voltage signals is achieved for any measuring process and the prerequisite of the miniaturization of the process is easily achieved so that it can be housed in a handly piece of equipment. It is particularly advantageous that averaging can take place over a randomly selected number of individual measurements as a function of the predetermined requirements for accuracy of the measurement. There is a particularly positive effect on the measuring accuracy if it is possible for averaging to take place over several individual measurements by internal equipment techniques. Additionally, it is possible to select the time for an interpolation over the individual measurements in such a way that the spread for the measured results remained low, keeping the range of error particularly narrow.

In order that the manner in which the foregoing and other objects are attained in accordance with the invention can be understood in detail, particularly advantageous embodiments thereof will be described with reference to the accompanying drawings, which form a part of this specification and wherein.

DETAILED DESCRIPTION OF PREFERRED EMBODIMENTS

Figure 1:
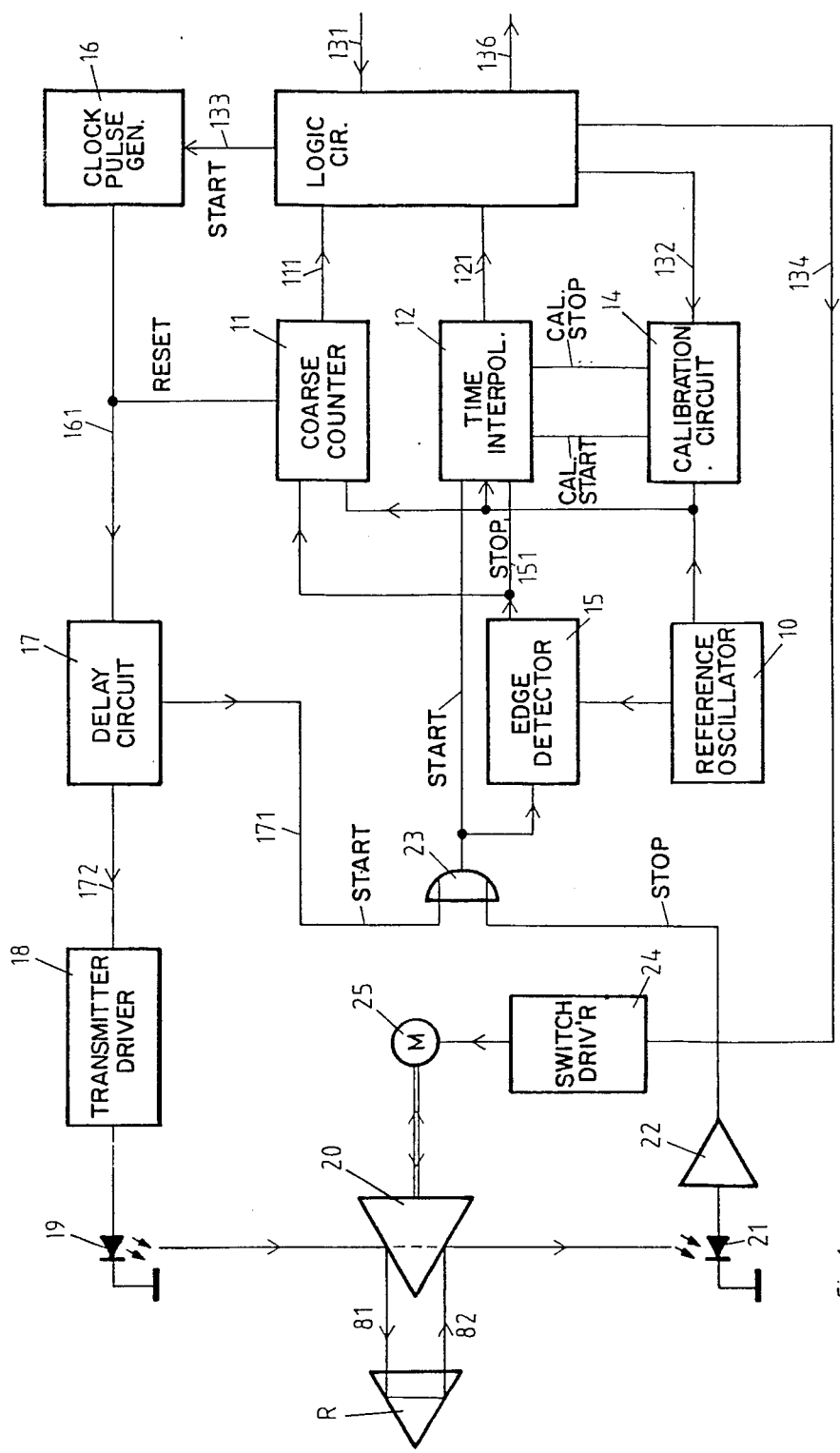
FIG. 1 is a schematic block diagram of an apparatus in accordance with the invention.

As shown in FIG. 1, a reference oscillator 10, which can be a fixed frequency crystal oscillator, produces a plurality of pulses which are coupled to the input of a coarse measurement counter 11, and to the input of a time interpolator circuit 12. An output 111 of counter 11 and an output 121 of interpolator 12 are connected to a logic circuit 13. An output 132 of the logic circuit 13 is connected to the control input of a calibration circuit 14 which provides start and stop input signals to interpolator circuit 12. The output of reference oscillator 10 is directly connected to calibration circuit 14. Between the reference oscillator 10 and the input to coarse counter 11 is an edge detector 15, the output of which is connected to the counter, as mentioned, and also to the second stop input of interpolator 12.

Logic circuit 13 produces a start signal on a start line 133 which is connected to a clock pulse generator 16. In the embodiment of FIG. 1, the output of clock pulse generator 16 is coupled to a conductor 161 which is connected to the input of a delay circuit 17 and to the timing input of counter 11. One output 172 of delay circuit 17 is connected to a transmitter driver circuit 18 which drives a transmission diode 19 for transmitting an optical pulse signal. The transmitted pulse signal passes to or through a switchable optical element 20 which can be switched between a transmissive calibration position and a reflective measuring position. In the calibration position the pulse signal from diode 19 passes directly to a receiving diode 21 which produces an electrical signal supplied through an amplifier 22 to one input of an OR-gate 23 to function as a stop signal. The other output of delay circuit 17 on line 171 is connected to the other input of the OR-gate 23. The output of gate 23 is connected to the input of edge detector 15 and also as a second start input signal to time interpolator circuit 12.

A switching driver 24 receives an input on line 134 from the output of logic circuit 13 and is used to drive a control element 25 for changing the state of optical element 20 as described.

The function of the apparatus of FIG. 1 is begun by initiating a measuring cycle with a trigger signal supplied from an external control to a trigger signal input 131 of logic circuit 13. In response to this, a signal is supplied to calibration circuit 14 on line 132 in response to which the circuit is enabled to produce a start signal for initiating the time interpolation. The calibration circuit 14 is supplied with the reference pulses from reference oscillator 10 and produces its start and stop signals with precisely defined time intervals in response to the receipt of reference pulses so that the start and stop signals supplied to circuit 12 are synchronized with the output of the reference oscillator. The interpolated values produced by circuit 12 are delivered on interpolator output line 121 to logic circuit 13 where they are stored for subsequent use during the calculation of the delay time and the measured distance.

Clock pulse generator 16 is influence by logic circuit 13 by a signal delivered on a start line 133 in such a way that it supplies a predetermined number of individual pulses and, consequently, starts a predetermined number of individual measurements. For example, the pulse sequence can be approximately 700 pulses per second. The series of individual measurements produced as a result of this series of pulses is used in a subsequently described manner for forming the average of the measured results in order to improve the accuracy of measurement.

The sequence of an individual measurement is described hereinafter and it should be remembered that the results of several such individual measurements are stored in logic circuit 13 until a desired number n of individual measurements have been accumulated, whereupon an average measured or test value is formed. The sequence begins with the provision of a signal on line 161 from clock pulse generator 16. This signal resets the coarse measurement counter 11 and activates the counter so that it starts counting with the first incoming pulse delivered on signal line 151 and stops with the second pulse. The signal on line 161 is also delivered to delay element 17 in response to which a signal is supplied on line 171 to gate 23 and to time interpolator circuit 12 as a second start input. Thus, the measurement between the aforementioned start signal and the next timing signal from reference oscillator 10 begins in interpolator circuit 12, the next timing signal being detected by edge detector 15 and supplied on signal line 151 to the second stop input of the time interpolator circuit and counter 11. The interpolated value reaches logic circuit 13 on interpolator output line 121.

The second output signal from delay element 17 on line 172, which is delayed with respect to the first output signal, stimulates transmitter drive 18 which causes diode 19 to emit a light pulse. Initially, the light pulse passes directly within the equipment through optical element 20 for the purpose of calibration and reaches receiver diode 21. The received signal produces an electrical signal which is delivered through amplifier 22 and OR-gate 23 to the second start input of interpolator 12. Simultaneously, edge detector 15 responds to the impulse and, with the next timing signal supplied by the reference oscillator, stops counter 11 and the action of interpolator 12 by a signal on line 151. The resulting values on counter 11 and interpolator 12 are delivered on lines 111 and 121 to logic circuit 13 where the results are averaged after reaching the desired number of such individual measurements and are stored as a calibration or zero distance.

At the end of this calibration process, logic circuit 13 supplies a signal on control line 134 to cause switching driver 24 to activate control element 25 so that the optical element 20 will be reflected out of the equipment, the next pulse then being reflected along path 81 to the reflective target indicated generally at R and creating an echo which returns along path 82. The optical element 20 diverts this received signal to reception diode 21. This reception is followed by the actual measuring process which is accomplished in substantially the same way as previously described for the calibration process. Individual mesurements take place along test path 81, 82. The average value is formed from the results of these individual measurements in logic circuit 13 and the zero or calibration distance obtained in the previous calibration process is subtracted and, finally, the result is delivered to a display on equipment output line 136 as a final test result for the distance between the equipment and reflector R, the display preferably being in the form of a linear measurement in meters, centimeters, inches, or the like, and the value can also be delivered to an external printer, not shown.

Figure 2:
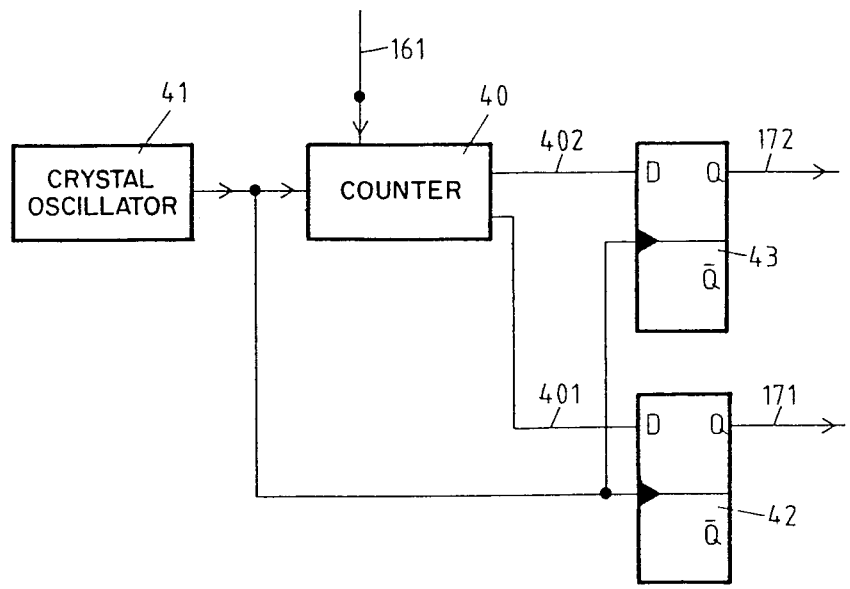
FIG. 2 is a schematic block diagram of a delay line circuit usable in the apparatus of FIG. 1.

FIG. 2 shows an embodiment of a circuit which can be used as delay circuit 17 in FIG. 1. Line 161 which delivers a clock pulse is supplied to the activating input of a second counter 40 which begins counting the pulses supplied by a pulse source 41 which can be a second autonomous fixed frequency oscillator. Following a predetermined number of pulse counts, a signal is supplied on line 401 and, after a further predetermined number of pulse counts, a signal is supplied on a second counter output line 402. The first output line is connected to the signal input D of a pulse-triggered bistable multivibrator 42 and the second output line 402 is connected to the signal input D of a second, similar, bistable pulse-controlled multivibrator 43. Both multi-vibrators 42 and 43 are triggered by the pulses from oscillator 41.

These bistable circuits can be of a type commonly known as JK flip-flop circuits which require a signal input and a trigger input for synchronized switching of states. Thus, the flip-flop action of the multi-vibrators is synchronized with the pulse edge from the second oscillator so that the delays between the signals are very precisely defined at the outputs Q of the two multivibrators on lines 171 and 172 by the characteristics of oscillator 41.

Figure 3:
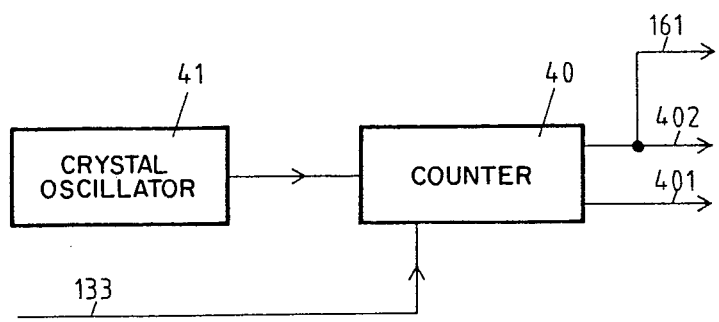
FIG. 3 is a partial block diagram showing a modified embodiment of a portion of the apparatus of FIG. 1.

FIG. 3 shows an example of how the clock generator 16 according to FIG. 1 can be combined with the delay circuit of FIG. 2. Output line 133 of logic circuit 13 of FIG. 1 is connected, instead, to the second counter 40 which is in the same configuration as shown in FIG. 2. Thus, the signal appearing on start line 133 initiates a number of individual measurements, whereupon the second counter 40 generates on lines 161, 401 and 402 the signals described in connection with FIGS. 1 and 2.

Figure 4:
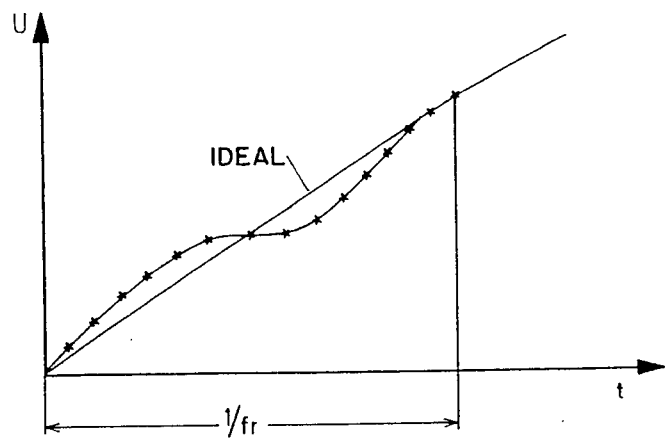
FIG. 4 is a graphical representation of voltage as a function of reciprocal frequency showing the variation between the ideal measurement characteristic and a plurality of measurement points accomplished with the apparatus of FIG. 1.

A certain non-linearity is inherent in the time interpolator 12 in accordance with FIG. 1 as a function of the interpolation interval, this non-linearity determining the measuring accuracy of the complete equipment. FIG. 4 graphically illustrates an example of the voltage variation at the output of time interpolator 12 as a function of time over an interpolation interval $1/f_r$, the factor $f_r$ signifying the pulse repetition frequency of reference oscillator 10. Thus, in FIG. 4, voltage is plotted as a function of time over a time t for n=14 individual measurements. The curve shows a typical non-linearity pattern. The linearly interpolated pattern, designated as an "ideal" line in FIG. 4, is also shown. The curve is such that in accordance with a preferred embodiment of the invention the signal appearing on line 71 of FIG. 1 is in a given phase relationship with respect to the edge of a pulse from reference oscillator 10. In this situation, there is uniform distribution of the measured values with time as shown in FIG. 4. This means that by synchronizing the clock generator 16 with reference oscillator 10, the accuracy of the overall circuit is significantly improved by the averaging of n measured values.

Figure 5:
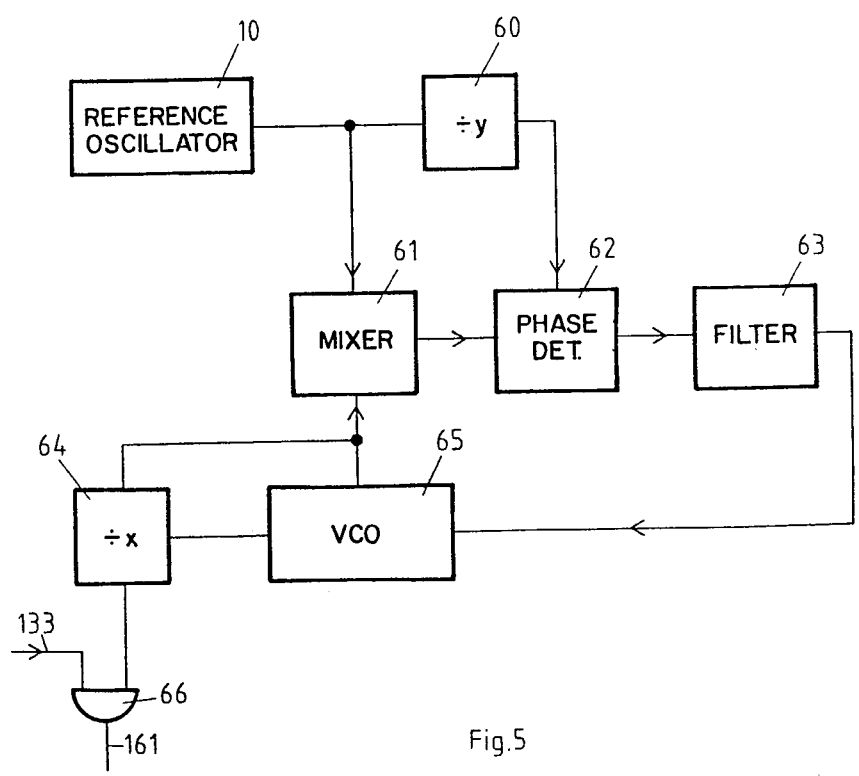
FIG. 5 is a partial block diagram of a modified form of a portion of the apparatus of FIG. 1.

FIG. 5 shows a preferred embodiment in which this synchronization between clock pulse generator 16 and reference oscillator 10 is achieved. As shown, the output of oscillator 10 is connected, in addition to the connections previously described, to a divider circuit 60 and a mixer circuit 61. The outputs of divider 60 and mixer 61 are connected to the two inputs of a phase detector circuit 62, the output of which is connected to a filter 63. The filter output is connected to a voltage controlled oscillator (VCO) 65, the output of which is connected to the other input of mixer 61 and also to a second divider circuit 64. The output of divider 64 is connected to one input of an AND-gate 66, the second input of which is connected to the start line 133 illustrated in FIG. 1. In accordance with a preferred embodiment, the reference frequency of oscillator 10 is 15 MHz, the division ratio x of divider 64 is 21520, the division ratio y of divider 60 is 1025, and the timing pulse rate on line 161 of FIG. 5 is approximately 70 Hz.

While certain advantageous embodiments have been chosen to illustrate the invention, it will be understood by those skilled in the art that various changes and modifications can be made therein without departing from the scope of the invention as defined in the appended claims.

What I claim is:

1. Apparatus for measuring the length of a path by measuring the time required for pulses to propagate along said path, the combination comprising:
   a transmitter and a receiver defining the ends of said path;
   means for producing a start signal;
   means to transmit said start signal to said transmitter to cause said transmitter to generate pulses which propagate along said path;
   means responsive to receipt of one of said pulses at said receiver to generate a stop signal;
   oscillator means for producing a train of reference pulses at a predetermined frequency;
   coarse counter means for counting the pulses received at said receiver between said start and stop signals;
   fine measurement interpolator means;
   and means to cause said fine measurement interpolator means to determine two residual times, one between said stop signal and a predetermined edge of the next following reference pulse, and a second residual time betwen said start signal and a predetermined edge of the next following reference pulse.

2. The combination of claim 1, and means to delay transmission of said start pulse from said means for producing said start pulse to said transmitter.

3. The combination of claim 1, wherein said path measuring pulses are light pulses, and wherein said transmitter and said receiver are electro-optical devices.

4. The combination of claim 3;
   means to calibrate said apparatus;
   said calibration means comprising a light controlling element positioned in said path;
   means to put said light controlling element in a first state where light is directed to and from a target and to selectively put said element in a second state wherein light from said transmitter passes along a known calibration path within said apparatus directly from said transmitter to said receiver;
   and the distance between said target and said apparatus corresponding to the length of the path to be measured.

5. The combination of claim 1, and a clock signal generator for producing clock signals comprising;
   a first divider circuit and a mixer circuit each having inputs connected to said means for producing reference pulses;
   a phase detector circuit connected to receive the outputs of said divider and mixer circuits and to produce an output signal representative of the phase differences thereof;
   a filter circuit connected to the output of said phase detector circuit;
   a voltage controlled oscillator having an input connected to receive the output of said filter circuit and an output connected to a second input of said mixer circuit;
   a second divider circuit connected to receive the output of said voltage controlled oscillator;
   and an AND-gate having one input connected to receive the output of said second divider and a second input connected to receive said start signals;
   whereby the clock signals from said gate are synchronized with said reference oscillator signals.

6. The combination of claim 1, and a clock signal generator for producing a series of adjustable clock signals in response to said start signal.

7. The combination of claim 6, and further including delay circuit means connected to receive said adjustable clock signals and to produce first and second delayed output signals;
    gate circuit means connected to receive said first output of said delay circuit means;
    pulse transmitter means connected to receive said second output of said delay circuit means and for producing a ranging pulse; and
    circuit means for connecting the output of said clock signal generator as a count start signal to said coarse counter.

8. The combination of claim 7, wherein said delay circuit means includes;
    a second oscillator circuit;
    a second counter circuit having a start input connected to receive said clock signals;
    a first bistable multivibrator having an input connected to receive a first output of said second counter for producing a start signal output as said first delayed output signal;
    a second bistable multivibrator having an input connected to receive a second output of said second counter, said second multivibrator being activated upon reaching a second counting rate to produce said second signal connected to said pulse transmitter means; and
    circuit means connecting the output of said second oscillator to the trigger inputs of both of said first and second multivibrators.

9. The combination of claim 1, and further including delay circuit means connected to receive said start signal for producing first and second delayed output signals;
    gate circuit means connected to receive said first output of said delay circuit means; and
    pulse transmitter means connected to receive said second output of said delay circuit means for producing a ranging pulse.

10. The combination of claim 9, wherein said delay circuit means includes;
    a second oscillator circuit;
    a second counter circuit having a count input connected to said second oscillator and a start input connected to receive said start signals;
    a first bistable multivibrator having an input connected to receive a first output of said second counter for producing a start signal output as said first delayed output signal;
    a second bistable multivibrator having an input connected to receive a second output of said second counter, said second multivibrator being activated upon reaching a second counting rate to produce said second signal connected to said pulse transmitter means; and
    circuit means connecting the output of said second oscillator to the trigger inputs of both of said first and second multivibrators.

11. The combination of claim 10, and further including circuit means for connecting said second output of said second counter to the start input of said coarse counter.

12. A method for mesuring the length of a path by measuring the time required for pulses to propagate along said path, comprising the steps of:
    providing a transmitter and a receiver to define the ends of said path;
    producing a start signal;
    transmitting said start signal to said transmitter to cause said transmitter to generate pulses which propagate along said path;
    generating a stop signal responsive to receipt of said pulses at said receiver;
    producing a train of reference pulses at a predetermined frequency;
    counting the pulses received at said receiver between said start and stop signals using a coarse counter;
    providing fine measurement interpolator means; and
    causing said fine measurement interpolator means to determine two residual times, one between said stop signal and a predetermined edge of the next following reference pulse, and a second residual time between said start signal and a predetermined edge of the next following reference pulse.

13. The method of claim 12, and delaying transmission of said start pulse from said means for producing said start pulse to said transmitter.

14. The method of claim 12, wherein said path measuring pulses are light pulses, and wherein said transmitter and said receiver are electro-optical devices.

15. The method of claim 14;
    and calibrating said apparatus using a light controlling element positioned in said path;
    putting said light controlling element in a first state where light is directed to and from a target and selectively putting said element in a second state wherein light from said transmitter passes along a known calibration path within said apparatus directly from said transmitter to said receiver;
    and wherein the distance between said target and said apparatus corresponds to the length of the path to be measured.

16. The method of claim 12, and providing a clock signal generator to produce clock signals comprising a first divider circuit and a mixer circuit each having inputs;
    connecting said inputs to receive said reference pulses;
    providing a phase detector circuit and connecting said phase detector circuit to receive the outputs of said divider and mixer circuits to produce an output signal representative of the phase differences thereof;
    providing a filter circuit connected to the output of said phase detector circuit;
    providing a voltage controlled oscillator having an input connected to receive the output of said filter circuit and an output connected to a second input of said mixer circuit;
    providing a second divider circuit connected to receive the output of said voltage controlled oscillator;
    and providing an AND-gate having one input connected to receive the output of said second divider and a second input connected to receive said start signals;
    whereby the clock signals from said gate are synchronized with said reference oscillator signals.

17. The method of claim 12, and producing a series of adjustable clock signals in response to said start signal.

18. The method of claim 17, and providing delay circuit means connected to receive said adjustable clock signals and to produce first and second delayed output signals;
    providing gate circuit means connected to receive said first output of said delay circuit means;

providing pulse transmitter means connected to receive said second output of said delay circuit means to produce a ranging pulse; and providing circuit means for connecting the output of said clock signal generator as a count start signal to said coarse counter.

19. Apparatus for measuring the length of a path by measuring the time required for a pulse to propagate along said path, the combination comprising:

a transmitter and a receiver defining the ends of said path;

a logic control circuit;

means for producing a start signal;

means to transmit said start signal to said transmitter to cause said transmitter to generate a pulse which propagates between the transmitter and the receiver;

means responsive to receipt of said pulse at said receiver to generate a stop signal;

means for producing reference pulses;

coarse counter means having first, second and third inputs and an output for counting whole ones of said reference pulses;

time interpolator means having first and second inputs and an output for evaluation of segments of said reference pulses smaller than whole ones of said reference pulses which may occur at the beginning and at the end of a path length measurement;

an OR-gate having first and second inputs and an output;

means to connect said first input of said OR-gate to said means to transmit said start signal to said transmitter;

means to connect said second input of said OR-gate to said stop signal generating means;

an edge detector having first and second inputs and an output;

means to connect said output of said OR-gate to both said first input of said time interpolator means and said first input of said edge detector;

means to supply said reference pulses to said second input of said edge detector, said time interpolator means and said coarse counter means;

means to connect said output of said edge detector to said second input of said time interpolator means and to said second input of said coarse counter means;

means to interconnect said means to transmit said start signal with said third input of said coarse counter means; and means to interconnect said logic control circuit with said output of said coarse counter means and said output of said time interpolator means.

20. The combination of claim 19, and a calibration circuit, said calibration circuit comprising first and second inputs, and a calibration start output and a calibration stop output; means to supply said reference pulses to said first input, means to interconnect said logic control circuit to said second input of said calibration circuit, and means to interconnect both of said calibration circuit start and stop outputs with said time interpolator means.

21. The combination of claim 19, and a delay circuit, means to connect said delay circuit into said means to transmit said start signal to said transmitter, said connection of said first input of said OR-gate to said means to transmit said start signal being made to said delay circuit, and said delay circuit serving to delay delivery of said start signal to said transmitter.

22. The combination of claim 19, and a path length switching means, means to cause said path length switching means to selectively define either a calibration path or a said path length to be measured, and means to interconnect said last mentioned means to cause with said logic control circuit.

23. The combination of claim 22, said apparatus comprising an optical system and said propagating pulses comprising pulses of light; said path length switching means comprising a dual state optical element which transmits light in one state for calibration and which reflects light in its second state for path measurement.

* * * * *